US008213797B2

(12) United States Patent
Mostert et al.

(10) Patent No.: US 8,213,797 B2
(45) Date of Patent: Jul. 3, 2012

(54) DWDM TRANSPORT OF CATV AND DIGITAL SIGNALS OVER OPTICAL FIBER IN LOW-DISPERSION SPECTRAL REGIONS

(75) Inventors: Willem A Mostert, Issaquah, WA (US); Sudhesh Mysore, Carlsbad, CA (US); Samuel Chang, Sunnyvale, CA (US); Shamino Wang, San Jose, CA (US); Charles Barker, Sunnyvale, CA (US); Oleh Sniezko, Highlands Ranch, CO (US)

(73) Assignee: Aurora Networks, Inc., Santa Clara, CA (US)

( * ) Notice: Subject to any disclaimer, the term of this patent is extended or adjusted under 35 U.S.C. 154(b) by 1004 days.

(21) Appl. No.: 11/810,392

(22) Filed: Jun. 4, 2007

(65) Prior Publication Data
US 2007/0297801 A1 Dec. 27, 2007

Related U.S. Application Data

(60) Provisional application No. 60/810,586, filed on Jun. 2, 2006, provisional application No. 60/923,827, filed on Apr. 16, 2007.

(51) Int. Cl.
*H04J 14/02* (2006.01)
(52) U.S. Cl. ............... 398/69; 398/79; 398/80; 398/81
(58) Field of Classification Search .............. 398/79
See application file for complete search history.

(56) References Cited

U.S. PATENT DOCUMENTS

| | | | | |
|---|---|---|---|---|
| 5,546,210 A | * | 8/1996 | Chraplyvy et al. | 398/79 |
| 5,880,865 A | * | 3/1999 | Lu et al. | 398/72 |
| 6,407,842 B1 | * | 6/2002 | Ma | 398/152 |
| 6,545,780 B1 | * | 4/2003 | Takachio et al. | 398/79 |
| 6,895,185 B1 | * | 5/2005 | Chung et al. | 398/72 |
| 6,922,431 B1 | * | 7/2005 | Weber et al. | 375/130 |
| 7,085,497 B2 | * | 8/2006 | Tiemann et al. | 398/107 |
| 7,120,359 B2 | * | 10/2006 | Way | 398/59 |
| 7,515,833 B2 | * | 4/2009 | Way | 398/183 |

(Continued)

FOREIGN PATENT DOCUMENTS
EP 1126638 8/2001

OTHER PUBLICATIONS

Performance of NRZ-Versus RZ-WDM Transmission Around Zero Dispersion Wavelength Over Dispersion-Shifted Fiber, Aisawa, et al., IEEE Photonic's Technology Letters, vol. 10, No. 4, Apr. 1998, p. 615-617.

F.Forghieri, et al., "Reduction of Four-Wave Mixing Crosstalk in WDM Systems Using Unequally Spaced Systems", IEEE Photonics Technology Letters, vol. 6, No. 6, Jun. 1994.

(Continued)

*Primary Examiner* — Danny Leung
(74) *Attorney, Agent, or Firm* — John Bruckner PC

(57) ABSTRACT

Methods and apparatus are described for DWDM transport of CATV and digital signals over optical fiber in low-dispersion spectral regions. A method includes transporting a plurality of optical carriers of different wavelengths over an optical link using wavelength division multiplexing, the optical link including a plurality of optical segments. The plurality of optical channel center wavelengths defined by the plurality of optical carriers are clustered proximate an average value of a zero-dispersion wavelength of the optical link, or near either a) a low wavelength edge or b) a high wavelength edge of a range of zero-dispersion wavelengths of the optical link and a plurality of optical channel center frequencies defined by the plurality of optical channel center wavelengths are non-uniformly spaced apart.

12 Claims, 9 Drawing Sheets

U.S. PATENT DOCUMENTS

| | | | |
|---|---|---|---|
| 7,577,367 B2* | 8/2009 | Way | 398/183 |
| 2004/0141748 A1* | 7/2004 | Spickermann et al. | 398/72 |
| 2007/0177873 A1* | 8/2007 | Hyun et al. | 398/72 |
| 2007/0189772 A1* | 8/2007 | Hyun et al. | 398/71 |
| 2007/0258713 A1* | 11/2007 | Jung et al. | 398/71 |
| 2007/0297801 A1* | 12/2007 | Mostert et al. | 398/81 |

OTHER PUBLICATIONS

A. Chraplyvy et al., "Limitations on Lightwave Communications Imposed by Optical-Fiber Nonlinearities", Journal of Lightwave Technology, vol. 8, No. 10, Oct. 1990.

* cited by examiner

DWDM TRANSPORT OF CATV AND DIGITAL SIGNALS OVER OPTICAL FIBER IN LOW-DISPERSION SPECTRAL REGIONS

CROSS-REFERENCES TO RELATED APPLICATIONS

This application claims a benefit of priority under 35 U.S.C. 119(e) from provisional patent applications U.S. Ser. No. 60/810,586, filed Jun. 2, 2006 and U.S. Ser. No. 60/923,827, filed Apr. 16, 2007, the entire contents of both of which are hereby expressly incorporated herein by reference for all purposes.

BACKGROUND INFORMATION

1. Field of the Invention

Embodiments of the invention relate generally to the field of transport of CATV and digital signals over optical fiber. More particularly, an embodiment of the invention relates to DWDM transport of CATV and digital signals over optical fiber in low-dispersion spectral regions.

2. Discussion of the Related Art

Bandwidth Race

CATV Multiple System Operators (MSOs) compete with Incumbent Local Exchange Carriers (ILECs) to offer the highest bandwidth connections to High Speed Data (HSD) subscribers. MSOs were first to offer HSD services and, consequently, enjoyed the lion's share of this market until recently. However, ILECs have recently found success in increasing their share of the HSD market by offering prices below those charged by MSOs. In turn, MSOs have responded, not by lowering their prices, but by offering higher bandwidths for the same price.

MSOs have historically been able to offer higher bandwidths on their hybrid fiber-coax (HFC) networks than ILECs with their traditional digital subscriber loop (DSL) services. Competing on the basis of bandwidth, rather than price, MSOs initially increased downstream speeds to 3 Mb/s, then 5 Mb/s and, more recently, to 10 Mb/s or higher for the same price they previously charged for only 1.5 Mb/s service.

So far, this has been a good strategy for MSOs. However, even higher speeds are now being planned by ILECs using improved variants of DSL such as ADSL2+. In an effort to maintain their market share, MSOs are responding by upgrading their networks to maintain their bandwidth superiority.

Bandwidth Upgrades Limited by Fiber Scarcity

The fiber node (FN) is the demarcation point between the fiber network and the coax network in an HFC network. In comparison with the traditional coax plant, which is limited to frequencies up to 1 GHz, optical fiber provides enormous bandwidth.

In HFC networks, fiber nodes have a nominal fiber service area of anywhere from 500 homes-passed to as many as 2,000 homes-passed. MSOs have been able to increase the bandwidth offered per subscriber by replacing older nodes with newer, segmentable nodes with multiple optical downstream receivers and upstream lasers, effectively reducing the fiber service area.

The next step to increase bandwidth is to either locate a second node next to the original node or to augment the existing node with one or more nodes closer to the subscribers. However, both of these methods exacerbate the problem of fiber scarcity as they require additional fibers to support the new nodes. Even MSOs with the foresight to place several fibers to each node are now finding that the available fibers are not sufficient for the number of new nodes that are required.

Moreover, recent architectures deployed nodes that serve 100 homes-passed but several nodes (often called a node cluster) share forward and reverse fiber to serve the same amount of homes-passed (500 to 2000). In the future, these same fibers will have to support cluster segmentation into individual nodes.

C-Band and L-Band DWDM

In the digital world, fiber scarcity has been solved through the use of dense wavelength-division-multiplexing (DWDM) in the 1550 nm window of optical fibers. In this technique, up to 128 (or more) high-speed digital channels are transported over a single fiber using lasers separated in the wavelength domain in the range of 1530 nm to 1565 nm, commonly referred to as the C-Band. The use of low-noise, high-power erbium-doped fiber amplifiers (EDFAs) optimized for use in the C-Band makes long-distance C-Band DWDM possible. The more recent development of EDFAs that operate in the L-Band (1565-1625 nm) allows the use of L-Band DWDM in digital networks. These digital networks operate over a variety of fiber types of various vintage. Standard transmission fiber such as Corning SMF-28 or its equivalent, with a zero dispersion wavelength in the O-Band (1260 nm to 1360 nm), is widely used for shorter links. Longer or more technically challenging links may employ not only standard transmission fiber, but other types of fiber such as dispersion-shifted fiber, large effective area fiber, or mixtures of fiber types in order to manage dispersion or other impairments.

C-Band DWDM technology has been successfully applied to HFC networks. Such architectures employ a broadcast layer that typically consists of an externally modulated broadcast transmitter carrying sub-carrier-multiplexed (SCM) analog video and QAM-modulated RF signals together with a narrowcast overlay consisting of directly modulated lasers transporting QAM-modulated RF sub-carriers transporting video, voice, and data. In the access part of an HFC network, the use of different transmitters for different signals is largely driven by the characteristics of standard transmission fiber with its zero dispersion wavelength located in the O-Band. In this fiber type, signal impairments caused by linear and nonlinear fiber effects, as described below, must be carefully managed. Although very effective technically, such an architecture is best suited for applications where longer distances and/or large numbers of wavelengths per fiber are required. It is an expensive solution for applications where shorter transport distances and/or lower numbers of wavelengths per fiber are needed. Moreover, this architecture requires some level of management for the RF frequencies of the SCM signals carried on the narrowcast transmitters.

CWDM

Another wavelength-division multiplexing (WDM) technique that is now being deployed is coarse-wavelength-division-multiplexing (CWDM). In this technique, widely-spaced (20 nm) optical signals in the range of 1270 nm to 1610 nm (a total of 18 channels) are employed. This technique has been successfully employed in HFC networks in the upstream links from optical nodes. The use of CWDM for transport of CATV services downstream, especially for the purpose of node segmentation, is currently attracting much attention.

Problems Due to Linear and Nonlinear Fiber Effects

All of the WDM techniques described above (C-Band DWDM, L-Band DWDM and CWDM) are presently employed for digital transport, but their application to the transport of CATV signals in the form of AM-VSB video and M-QAM data is complicated by two types of impairments: crosstalk due to the third-order nonlinear-optical susceptibility of the fiber and distortion caused by dispersion acting on the optical signals generated by directly-modulated DFB lasers.

The third-order nonlinear optical susceptibility of the optical fiber leads to crosstalk between optical carriers through the effects of Stimulated Raman Scattering (SRS), self-phase modulation (SPM), cross-phase modulation (XPM), and the more general case of four-wave-mixing (4WM).

The light emitted by a directly-modulated DFB laser exhibits frequency chirp—the wavelength of the light emitted by the laser varies with the output power of the laser. Chromatic dispersion of the optical fiber acts upon this frequency-chirped light to create distortion in the sub-carrier multiplexed signals of typical analog CATV video transport, primarily composite second-order (CSO) distortion.

SRS-Induced Crosstalk

Although SPM can be a problem in single-channel systems, the main sources of crosstalk in WDM systems are XPM (cross-phase modulation) and SRS (simulated Raman scattering). Of these, SRS-induced crosstalk dominates over XPM crosstalk for channel separation greater than several nm, such as in CWDM systems. SRS crosstalk is a function of the RF frequency, optical power and fiber length. For example, the severity of SRS crosstalk as a function of the wavelength separation of two sub-carrier-multiplexed lightwaves at the CATV frequencies of 55 MHz and 499 MHz are shown in FIGS. 1 and 2 for typical CATV power levels and fiber distances. This crosstalk severely limits the number of downstream CWDM wavelengths and their launch power into the fiber.

CSO Induced by Fiber Dispersion and Laser Chirp

Another severe impediment to the use of CWDM for CATV transport is the CSO induced by fiber dispersion and laser chirp. This problem can be avoided through the use of externally-modulated laser transmitters with negligible chirp. Indeed, this type of transmitter is used to transport CATV signals over a 1550 nm system. However, the cost of externally-modulated laser transmitters is an order of magnitude greater than for directly-modulated CATV laser transmitters. Consequently, the use of externally-modulated laser transmitters in applications such as the segmentation of nodes served by directly-modulated 1310 nm laser transmitters cannot meet the cost constraints of such applications.

For directly-modulated DFB laser transmitters, the worst case CSO for analog channels in the broadcast band (55 MHz-550 MHz) occurs at the upper edge of the band and is plotted in FIG. 3 for various values of laser chirp. Note that since this is due to a linear fiber effect, the induced CSO is independent of optical power in the fiber. However, the dispersion-induced CSO depends on the total dispersion in the fiber (especially SMF-28 and equivalent fibers), which is usually greater if the wavelength (optical frequency) is further away from the zero dispersion wavelength of the fiber.

It can be seen that dispersion-induced CSO increases very rapidly as one moves away from the zero-dispersion wavelength of conventional optical fiber (around 1311 nm). Consequently, CATV transport using CWDM can only be accomplished with a few CWDM wavelengths and even this requires severe constraints on the laser chirp.

Other remedies that are currently being investigated include the use of low-chirp, directly-modulated External Cavity Lasers (ECL). However, a problem with these other approaches is that external cavity lasers, and the predistortion and SBS-suppression circuitry required, are significantly more expensive than traditional DFB lasers.

What is needed is an cost-effective approach that increases bandwidth in fiber scare networks while simultaneously minimizing distortion and cross talk.

SUMMARY OF THE INVENTION

There is a need for the following embodiments of the invention. Of course, the invention is not limited to these embodiments.

According to an embodiment of the invention, a process comprises: transporting a plurality of optical carriers of different wavelengths over a transport fiber using wavelength division multiplexing, wherein a plurality of optical channel center wavelengths defined by the plurality of optical carriers are clustered proximate a zero dispersion wavelength of the transport fiber and wherein a plurality of optical channel center frequencies defined by the plurality of optical channel center wavelengths are non-uniformly spaced apart. According to another embodiment of the invention, an apparatus comprises a low dispersion wavelength division multiplexing network transporting a plurality of optical carriers of different wavelengths using wavelength division multiplexing, the low dispersion wavelength division multiplexing network including: an optical multiplexer; a transport fiber coupled to the multiplexer; and an optical demultiplexer coupled to the transport fiber, wherein a plurality of optical channel center wavelengths defined by the plurality of optical carriers are clustered proximate a zero dispersion wavelength of the transport fiber and wherein a plurality of optical channel center frequencies defined by the plurality of optical channel center wavelengths are non-uniformly spaced apart.

According to another embodiment of the invention, a process comprises transporting a plurality of optical carriers of different wavelengths over an optical link using wavelength division multiplexing, the optical link including a plurality of optical segments, wherein a plurality of optical channel center wavelengths defined by the plurality of optical carriers are clustered proximate an average value of a zero-dispersion wavelength of the optical link, or near either a) a low wavelength edge or b) a high wavelength edge of a range of zero-dispersion wavelengths of the optical link and wherein a plurality of optical channel center frequencies defined by the plurality of optical channel center wavelengths are non-uniformly spaced apart. According to another embodiment of the invention, an apparatus, comprising a low dispersion wavelength division multiplexing network transporting a plurality of optical carriers of different wavelengths using wavelength division multiplexing, the low dispersion wavelength division multiplexing network including: an optical multiplexer; an optical link coupled to the multiplexer, the optical link including a plurality of optical segments; and an optical demultiplexer coupled to the optical link, wherein a plurality of optical channel center wavelengths defined by the plurality of optical carriers are clustered proximate an average value of a zero-dispersion wavelength of the optical link, or near either a) a low wavelength edge or b) a high wavelength edge of a range of zero-dispersion wavelengths of the optical link and wherein a plurality of optical channel center frequencies defined by the plurality of optical channel center wavelengths are non-uniformly spaced apart.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation.

Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The invention presented here solves the problem of cost-effectively expanding bandwidth capacity in fiber-scarce HFC networks by transporting multiple wavelengths over a single fiber using a DWDM system whose wavelengths are densely clustered close to the zero dispersion wavelength of the transport fiber. In SMF-28 and equivalent fibers, which are predominant in access HFC networks, such wavelengths lie in the O-Band (1260 nm-1360 nm). In addition to this particularly important application, the invention is generally applicable to the use of wavelength division multiplexing near the zero-dispersion wavelength of any fiber, including, but not limited to, dispersion shifted and other fibers whose zero-dispersion wavelength lies in different spectral regions. Such a system will be referred to here as LDWDM (low dispersion wavelength division multiplexing) to distinguish it from other WDM technologies.

Figure 1:
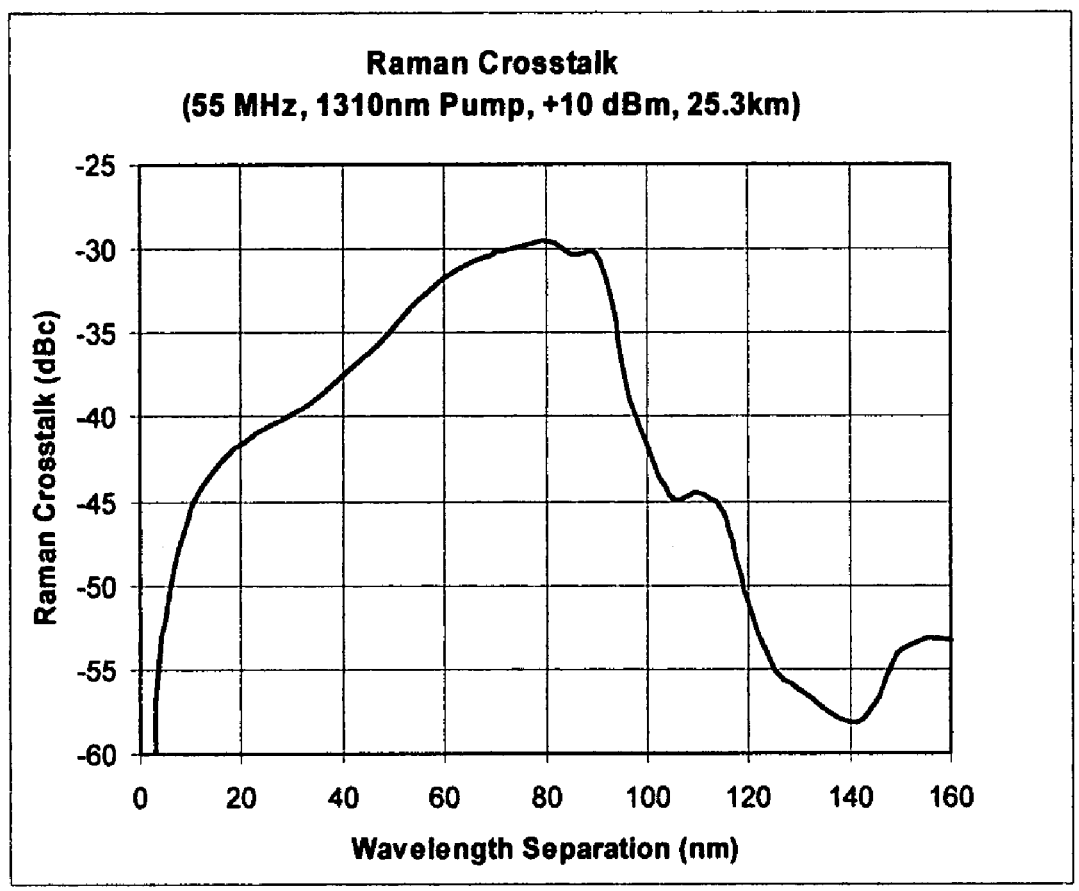
FIG. 1 is a trace view of SRS-induced crosstalk at 55 MHz, representing an embodiment of the invention.
Figure 2:
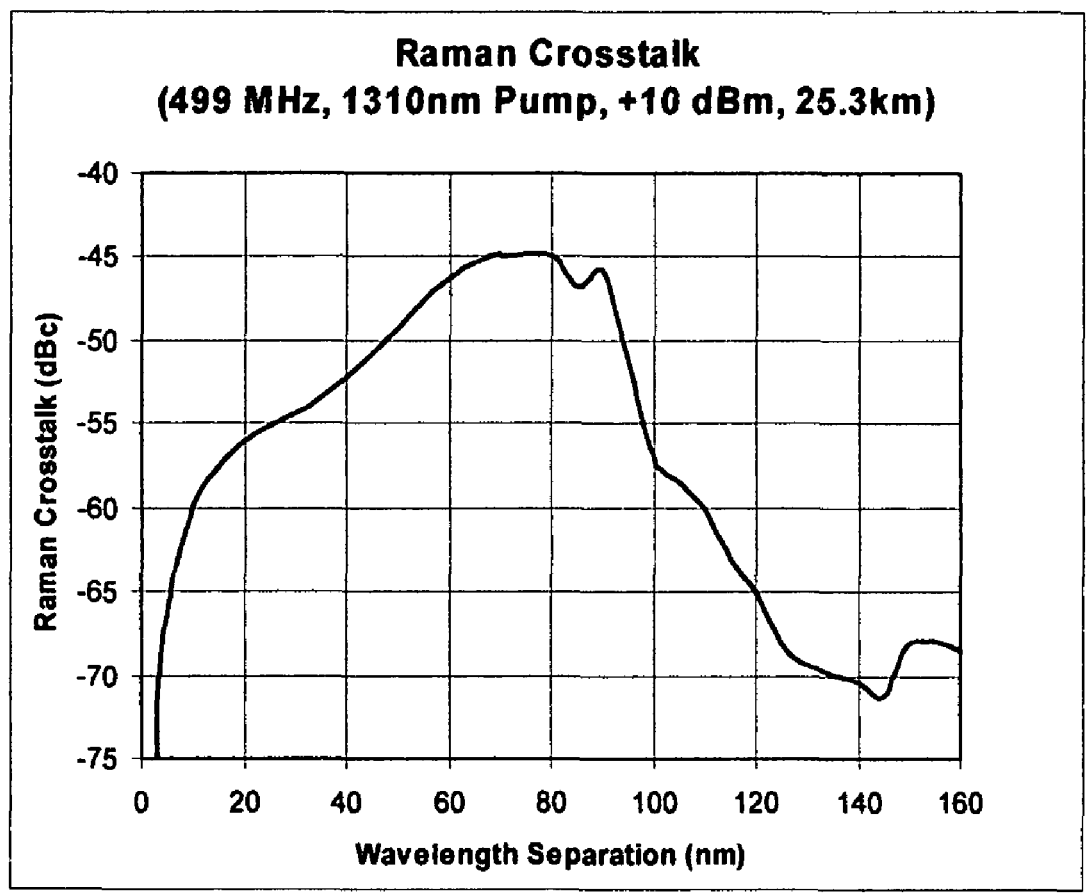
FIG. 2 is a trace view of SRS-induced crosstalk at 499 MHz, representing an embodiment of the invention.
Figure 3:
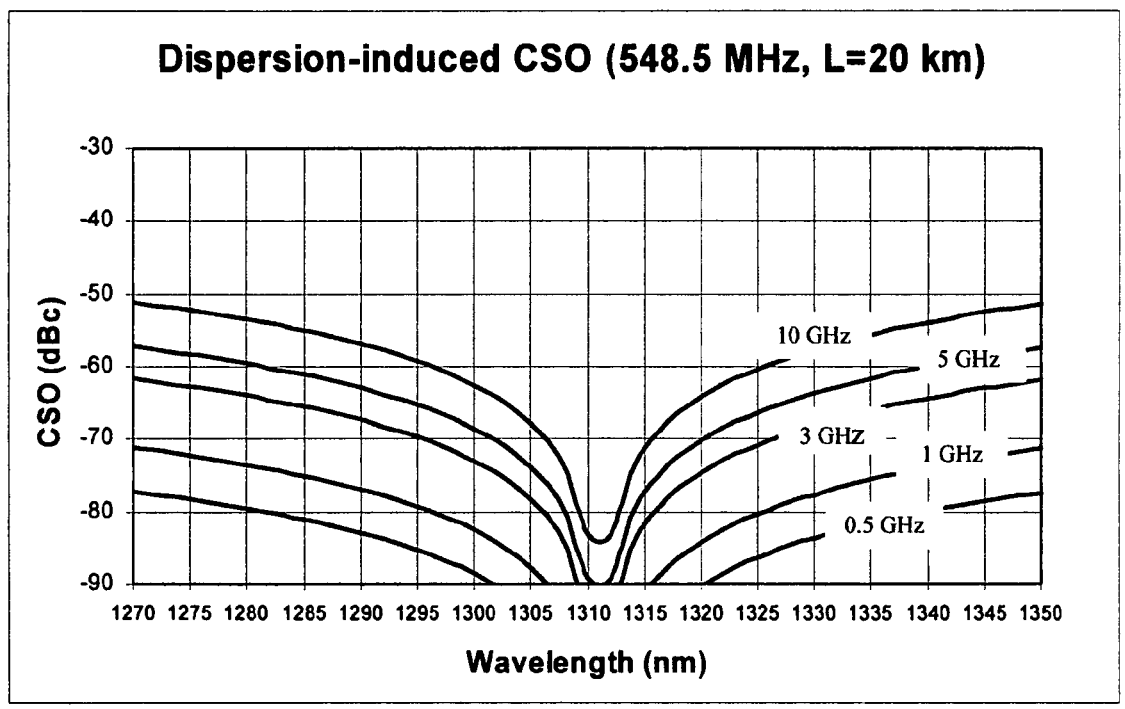
FIG. 3 is a trace view of dispersion-induced CSO vs λ for several values of laser chirp, representing an embodiment of the invention.

A WDM system operating in a low-dispersion spectral region (LDWDM) is distinctly different from other WDM technologies, such as CWDM and C-Band and L-Band DWDM that operate far from the zero dispersion wavelength of the fiber. It can be seen from FIGS. 1, 2 and 3 that by clustering several wavelengths near the zero-dispersion wavelength of the transport fiber (for SMF-28 or equivalent fiber, this is approximately 1311 nm), the problems of SRS-induced crosstalk and dispersion/chirp-induced CSO that plague other WDM technologies are greatly ameliorated. Because an LDWDM system operates close to the zero dispersion wavelength of the fiber, a wide variety of signals, including RF SCM analog video, RF SCM quasi-analog signals such as M-QAM and N-VSB, and digital signals such as SONET, GbE, 10GbE, FC-1, FC-2, FC-10, etc., can be transported on multiple DWDM wavelengths over a single fiber without the need for significant restrictions on laser transmitter chirp. Consequently, either externally-modulated or directly-modulated laser transmitters can be used in an LDWDM system. However, the major advantage provided by this invention is the ability to use low-cost, directly modulated lasers with constraints on laser chirp that do not differ significantly from those placed on 1310 nm directly-modulated DFB lasers that are used in current generation transmitters.

In contrast to LDWDM, competing WDM technologies such as CWDM or C-Band and L-Band DWDM that transport analog or quasi-analog signals using directly-modulated DFB laser transmitters operating at wavelengths far from the zero-dispersion wavelength of the fiber must restrict the type or the bandwidth of signals they transport, the number of usable wavelengths, or the transport distance in the fiber. For example, over SMF-28 or equivalent type fiber, C-Band and L-Band DWDM directly-modulated laser transmitters can carry only QAM and digital signals with strict frequency allocation rules. In the case of CWDM directly-modulated laser transmitters operating over SMF-28 fiber, the number of wavelengths that can be carried on a single fiber is greatly reduced and severe restrictions are imposed on laser chirp and fiber distances. Alternative technologies and systems using very low chirp transmitters (for example, externally modulated transmitters or ECL-based transmitters) are too expensive for many commercial applications.

Figure 4:
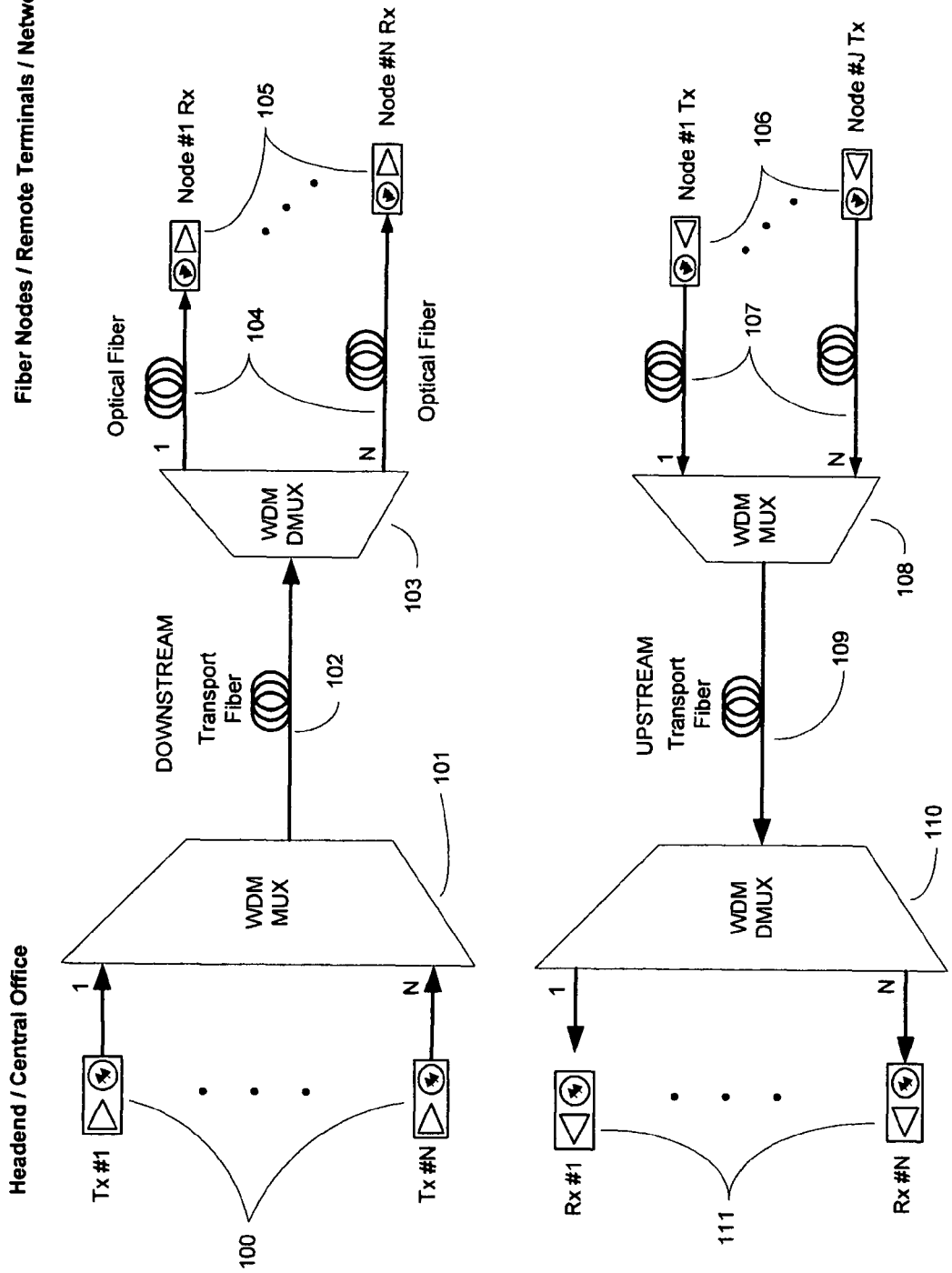
FIG. 4 is a block schematic view of a LDWDM (low dispersion wavelength division multiplexing) network, representing an embodiment of the invention.
Figure 5:
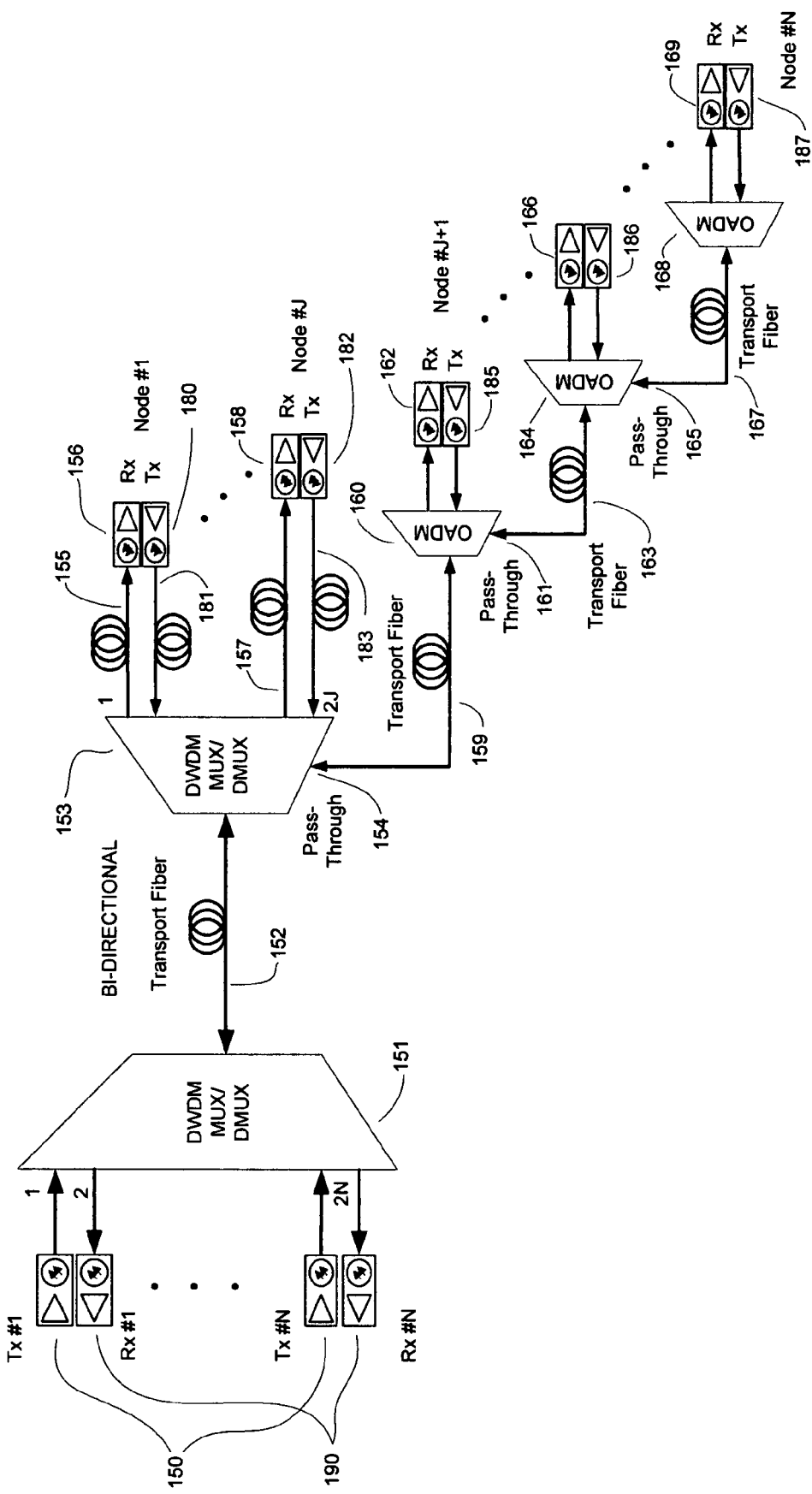
FIG. 5 is a block schematic view of a bi-directional LDWDM (low dispersion wavelength division multiplexing) network, representing an embodiment of the invention.

As indicated above, the invention, referred to here as LDWDM, is a wavelength division multiplexed communication system designed and optimized to operate with multiple wavelengths in close proximity to the zero dispersion wavelength of the transport fiber. By way of example, a particularly simple embodiment of such an LDWDM system is shown schematically in FIG. 4. The system includes separate, unidirectional upstream and downstream links. The downstream link is comprised of N (where N≧2) laser transmitters 100, each at a distinct wavelength selected from an optical channel plan (to be described in detail below), whose outputs are combined by an optical multiplexer 101 onto a transport fiber 102 and then separated into individual wavelengths by an optical demultiplexer 103. Each wavelength is delivered by optical fiber 104 to a receiver 105. Each receiver 105 may be located near the optical demultiplexer 103, or may be located some distance away, such as in remote nodes or terminals.

Downstream laser transmitters 100 may be located with the optical multiplexer 101 in a headend, hub, central office, or other similar signal processing facility, or the downstream laser transmitters 100 and optical multiplexer 101 may be functionally distributed among several headends, hubs, central offices, or similar signal processing facilities. The downstream optical demultiplexer 103 may be located in a hub or a remote facility such as a node, fiber splice enclosure, fiber management cabinet, or similar facility, or the optical demultiplexer 103 may be functionally distributed among several such facilities. The optical receivers 105 may be located near the optical demultiplexer 103 or may be located at various distances from it in remote nodes or terminals.

An upstream link includes M (where M may or may not equal N) return laser transmitters 106, each at a distinct wavelength selected from an optical channel plan, whose outputs are delivered to the inputs of an optical multiplexer 108 by optical fibers 107. The return laser transmitters 106 may be located near the optical multiplexer 108 or may be located various distances away, such as in remote nodes or terminals. The optical multiplexer 108 combines the outputs of the return laser transmitters 106 onto a transport fiber 109. The combined wavelengths are separated into individual wavelengths by an optical demultiplexer 110. Each wavelength is delivered by optical fiber to a return receiver 111.

The return laser transmitters 106 may be located in nodes or terminals that may be located near the upstream optical multiplexer 108 or remotely from it. The upstream optical multiplexer 108 may be located in a hub or a remote facility such as a node, fiber splice enclosure, fiber management cabinet, or similar facility, or the optical multiplexer 108 may be functionally distributed among several such facilities. The return receivers 111 may be located with the optical demultiplexer 110 in a headend, hub, central office, or other similar signal processing facility, or the return receivers 111 and optical demultiplexer 110 may be functionally distributed among several headends, hubs, central offices, or similar signal processing facilities.

The preferred embodiment would use directly-modulated DFB laser transmitters because of their cost advantage; however, externally-modulated transmitters may also be used in either link. The transmitters 100 and 106 may transport a variety of signals, such as but not limited to RF SCM analog-modulated video, RF SCM M-QAM and N-VSB, and digital signals such as SONET, GbE, 10GbE, Fiber Channel, etc.

The individual wavelength at which each downstream laser transmitter 100 operates is selected from a set of optical channel wavelengths that are in close proximity to the zero dispersion wavelength of the downstream transport fibers 102 and 104. Similarly, the individual wavelength of each return laser transmitter 106 is selected from a set of optical channel wavelengths that are in close proximity to the zero dispersion wavelength of the upstream transport fibers 107 and 109. In an embodiment in which the transport fibers 102 and 104 are SMF-28 or an equivalent fiber type, the wavelengths of transmitters 100 would lie in the O-Band. In an embodiment in which the transport fibers 102 and 104 are dispersion shifted fibers with zero dispersion wavelength in the C-Band, the wavelengths of the transmitters 100 would lie in the C-Band. Similarly, in an embodiment in which the transport fibers 107 and 109 are SMF-28 or an equivalent fiber type, the wavelengths of transmitters 106 would lie in the O-Band. In an embodiment in which the transport fibers 107 and 109 are dispersion shifted fibers with zero dispersion wavelength in the C-Band, the wavelengths of the transmitters 106 would lie in the C-Band.

The optical channel center wavelengths, optical channel passbands and optical channel spacings of the optical multiplexers 101 and 108 and the optical demultiplexers 103 and 110 are determined by the optical channel frequency plan. The optical channel separation or spacing of the optical frequency plan is non-uniform, as will be discussed below. A typical embodiment would have multiple wavelengths whose channel spacing ranges from 0.5 nm up to 20 nm, although other channel spacing ranges are possible. The optical multiplexers 101 and 108 and the optical demultiplexers 103 and 110 may be implemented by a variety of technologies including, but not limited to, thin film interference filters, fiber Bragg gratings, bulk diffraction gratings, array waveguide gratings, and may be implemented in a consolidated or a distributed manner.

Other embodiments of LDWDM systems are presented in FIGS. 5-8. A block diagram of a bidirectional LDWDM system, where downstream and upstream communication signals are transported on a common transport fiber, is presented in FIG. 5. The outputs of N downstream laser transmitters 150, each at a distinct wavelength or frequency selected from an optical channel plan, are combined onto a bidirectional optical transport fiber 152 by a bidirectional optical multiplexer/demultiplexer (mux/demux) 151.

Of the N downstream optical carriers, J optical carriers are separated into individual wavelengths or frequencies by a bidirectional optical mux/demux 153. Each of the J downstream optical carriers separated at the bidirectional mux/demux is carried by separate optical fibers 155, 157 to corresponding downstream receivers 156, 158, which may be located in remote nodes or terminals.

The remaining N-J optical carriers are directed to the pass-through port 154 of the bidirectional mux/demux 153 and carried by bidirectional transport fibers 159, 163, and 167 through a cascade of optical add/drop multiplexers 160, 164, 168, each of which selects a particular downstream wavelength to deliver to corresponding downstream receivers 162, 166, 169, which may be located in remote nodes or terminals.

The outputs of N-J return laser transmitters 187, 186, 185, each at a distinct wavelength or frequency selected from an optical channel plan (described in detail below) are multiplexed by a cascade of optical add/drop multiplexers 168, 164, 160 onto bidirectional transport fibers 167, 163, 159 and into the pass-through port 154 of the bidirectional optical mux/demux 153.

The outputs of the J return laser transmitters 180, 182, each at a distinct optical frequency or wavelength selected from an optical channel plan (described in detail below), are multiplexed with the outputs of return laser transmitters 185, 186, 187 by the bidirectional optical mux/demux 153 onto the bidirectional transport fiber 152. The bidirectional optical mux/demux 151 separates the N return optical carriers by individual wavelengths and delivers them to corresponding return receivers 190.

The downstream laser transmitters 150, the bidirectional mux/demux 151, and the return receivers 190 may typically be located in a headend, hub, central office, or similar signal processing facility. The downstream receivers 156, 158, 162, 166, 169 and the return transmitters 180, 182, 185, 186, 187 may typically be located in optical nodes or remote terminals.

The preferred embodiment would use directly-modulated DFB laser transmitters because of their cost advantage; however, externally-modulated transmitters may also be used in any link. The transmitters 100 and 106 may transport a variety of signals, such as but not limited to RF SCM analog-modulated video, RF SCM M-QAM and N-VSB, and digital signals such as SONET, GbE, 10GbE, Fiber Channel, etc.

The individual wavelengths at which each downstream laser transmitter 150 and each return laser transmitter 180, 182, 185, 186, 187 operates is selected from a set of optical channel wavelengths that are in close proximity to the zero dispersion wavelength of the bidirectional transport fibers 152, 159, 163, 167. In an embodiment in which bidirectional transport fibers 152, 159, 163, 167 are SMF-28 or an equivalent fiber, the wavelengths of transmitters 150, 180, 182, 185, 186, 187 would lie in the O-Band. In an embodiment in which the bidirectional transport fibers 152, 159, 163,167 are dispersion shifted fibers with zero-dispersion wavelength in the C-Band, the wavelengths of transmitters 150, 180, 182, 185, 186, 187 would lie in the C-Band.

The optical channel center wavelengths, optical channel passbands and optical channel spacings of the bidirectional optical mux/demuxes 151, 153 and the optical add/drop multiplexers 160, 164, 168 are determined by the optical channel frequency plan. The optical channel separation or spacing of the optical frequency plan is non-uniform, as will be discussed below. A typical embodiment would have multiple wavelengths whose channel spacing ranges from 0.5 nm up to 20 nm, although other channel spacing ranges are possible. The bidirectional optical mux/demuxes 151, 153 and the optical add/drop multiplexers 160, 164, 168 may be implemented by a variety of technologies including, but not limited to, thin film interference filters, fiber Bragg gratings, bulk diffraction gratings, array waveguide gratings, and may be implemented in a consolidated or a distributed manner.

Figure 6:
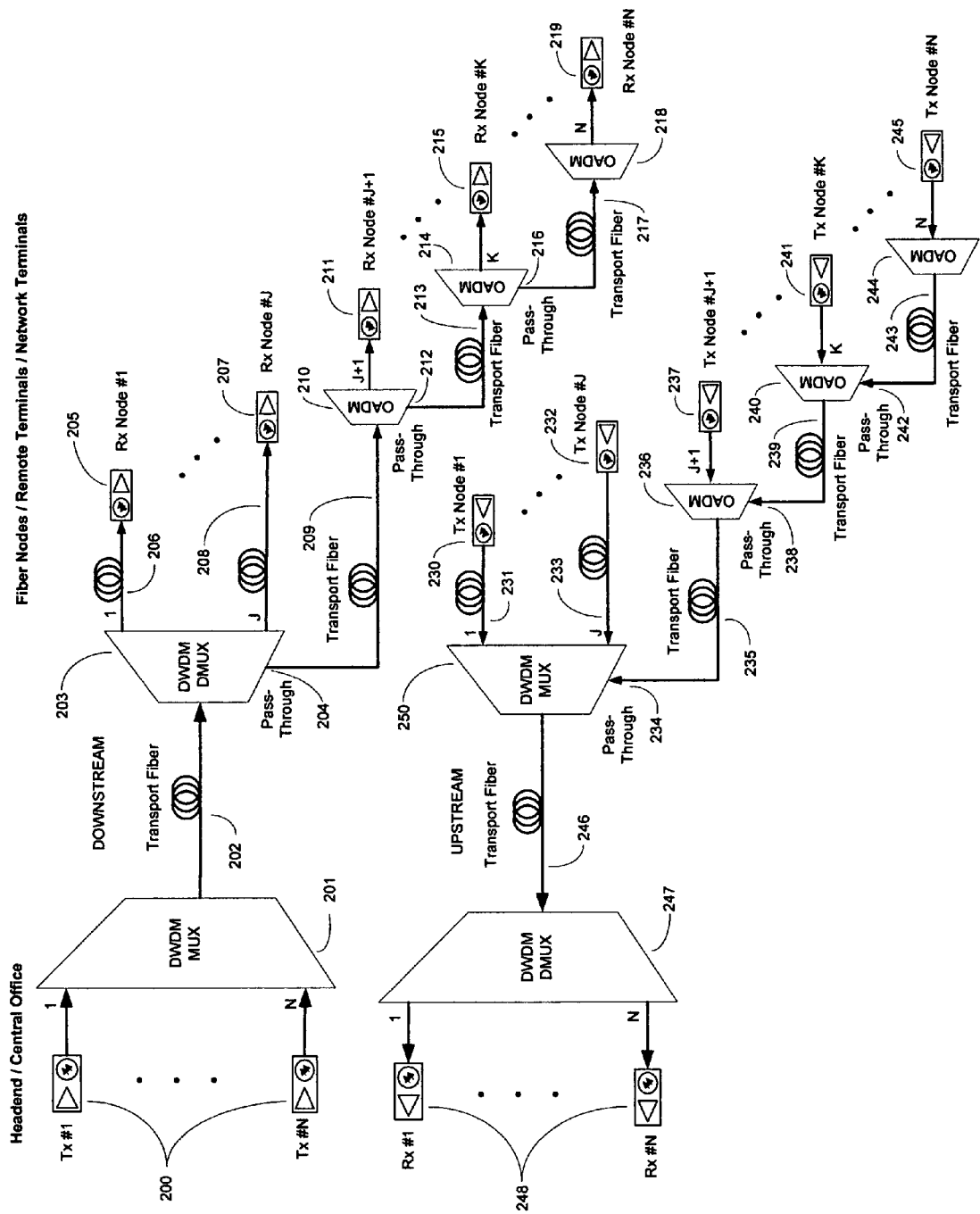
FIG. 6 is a block schematic view of a unidirectional LDWDM (low dispersion wavelength division multiplexing) network, representing an embodiment of the invention.

The block diagram of a unidirectional LDWDM system with distributed optical multiplexing and demultiplexing is presented in FIG. 6. The system includes separate, unidirectional upstream and downstream links. The downstream link is comprised of N (where $N \geq 2$) laser transmitters 200, each at a distinct wavelength selected from an optical channel plan, whose outputs are combined by an optical multiplexer (mux) 201 onto a transport fiber 202. An optical demultiplexer (demux) 203 separates J optical carriers into individual wavelengths and delivers them by optical fibers 206, 208 to downstream receivers 205, 207, which may be located in remote nodes or terminals.

The remaining N-J optical carriers are directed to the pass-through port 204 and carried by transport fibers 209, 213, 217 through a cascade of optical add/drop multiplexers 210, 214, 218, each of which selects a particular wavelength to deliver to corresponding downstream receivers 211, 215, 219, which may be located in remote nodes or terminals.

The outputs of N-J return laser transmitters 245, 241, 237, each at a distinct optical frequency selected from an optical channel plan are multiplexed by a cascade of optical add/drop multiplexers 244, 240, 236 onto transport fibers 243, 239, 235 and into the pass-through port 234 of optical multiplexer 250.

The outputs of J return laser transmitters 230, 232, each at a distinct optical frequency selected from an optical channel plan are multiplexed with the outputs of return laser transmitters 245, 241, 237 by optical multiplexer 250 onto the transport fiber 246. The optical demux 247 separates the N return optical carriers by individual wavelength and delivers them to return receivers 248.

The downstream receivers 205, 207, 211, 215, 219 and the return laser transmitters 230, 232, 237, 241, 245 may be located in remote nodes or terminals. The downstream optical demux 203 and the upstream optical multiplexer 250 may be jointly or separately located in hubs or remote facilities such as nodes, fiber splice enclosures, fiber management cabinets, or similar facilities.

The optical add/drop multiplexers 210, 214, 218, 236, 241, 245 may be located jointly or separately in remote nodes, terminals, fiber splice enclosures, fiber management cabinets, or similar facilities. The downstream transmitters 200 and the return receivers 248 may be located with the downstream optical multiplexer 201 and the upstream optical demultiplexer 247 in a headend, hub, central office, or other similar signal processing facility, or the downstream transmitters 200, the return receivers 248, the downstream optical multiplexer 201 and the upstream optical demultiplexer 247 may be functionally distributed among several headends, hubs, central offices, or similar signal processing facilities.

The preferred embodiment would use directly-modulated DFB laser transmitters because of their cost advantage; however, externally-modulated transmitters may also be used in either link. The transmitters 200, 230, 232, 237, 241, 245 may transport a variety of signals, such as but not limited to RF SCM analog-modulated video, RF SCM M-QAM and N-VSB, and digital signals such as SONET, GbE, 10GbE, Fiber Channel, etc.

The individual wavelength at which each downstream laser transmitter 200 operates is selected from a set of optical channel wavelengths that are in close proximity to the zero dispersion wavelength of the downstream transport fibers 202, 206, 208, 209,213, 217. Similarly, the individual wavelength of each return laser transmitter 230, 232, 237, 241, 245 is selected from a set of optical channel wavelengths that are in close proximity to the zero dispersion wavelength of the upstream transport fibers 231, 233, 243, 239, 235, 246. In an embodiment in which the transport fibers 202, 206, 208, 209,213, 217 are SMF-28 or an equivalent fiber type, the wavelengths of transmitters 200 would lie in the O-Band. In an embodiment in which the transport fibers 202, 206, 208, 209,213, 217 are dispersion shifted fibers with zero dispersion wavelength in the C-Band, the wavelengths of the transmitters 200 would lie in the C-Band. Similarly, in an embodiment in which the transport fibers 231, 233, 243, 239, 235, 246 are SMF-28 or an equivalent fiber type, the wavelengths of transmitters 230, 232, 237, 241, 245 would lie in the O-Band. In an embodiment in which the transport fibers 231, 233, 243, 239, 235, 246 are dispersion shifted fibers with zero dispersion wavelength in the C-Band, the wavelengths of the transmitters 230, 232, 237, 241, 245 would lie in the C-Band.

The optical channel center wavelengths, optical channel passbands and optical channel spacings of the optical multiplexers 201, 250, the optical demultiplexers 203 and 247, and the optical add/drop multiplexers 210, 214, 218, 236, 240, 244 are determined by the optical channel frequency plan. The optical channel separation or spacing of the optical frequency plan is non-uniform. A typical embodiment would have multiple wavelengths whose channel spacing ranges from 0.5 nm up to 20 nm, although other channel spacing ranges are possible. The optical multiplexers 201, 250, the optical demultiplexers 203 and 247, and the optical add/drop multiplexers 210, 214, 218, 236, 240, 244 may be implemented by a variety of technologies including, but not limited to, thin film interference filters, fiber Bragg gratings, bulk diffraction gratings, array waveguide gratings, and may be implemented in a consolidated or a distributed manner.

Figure 7:
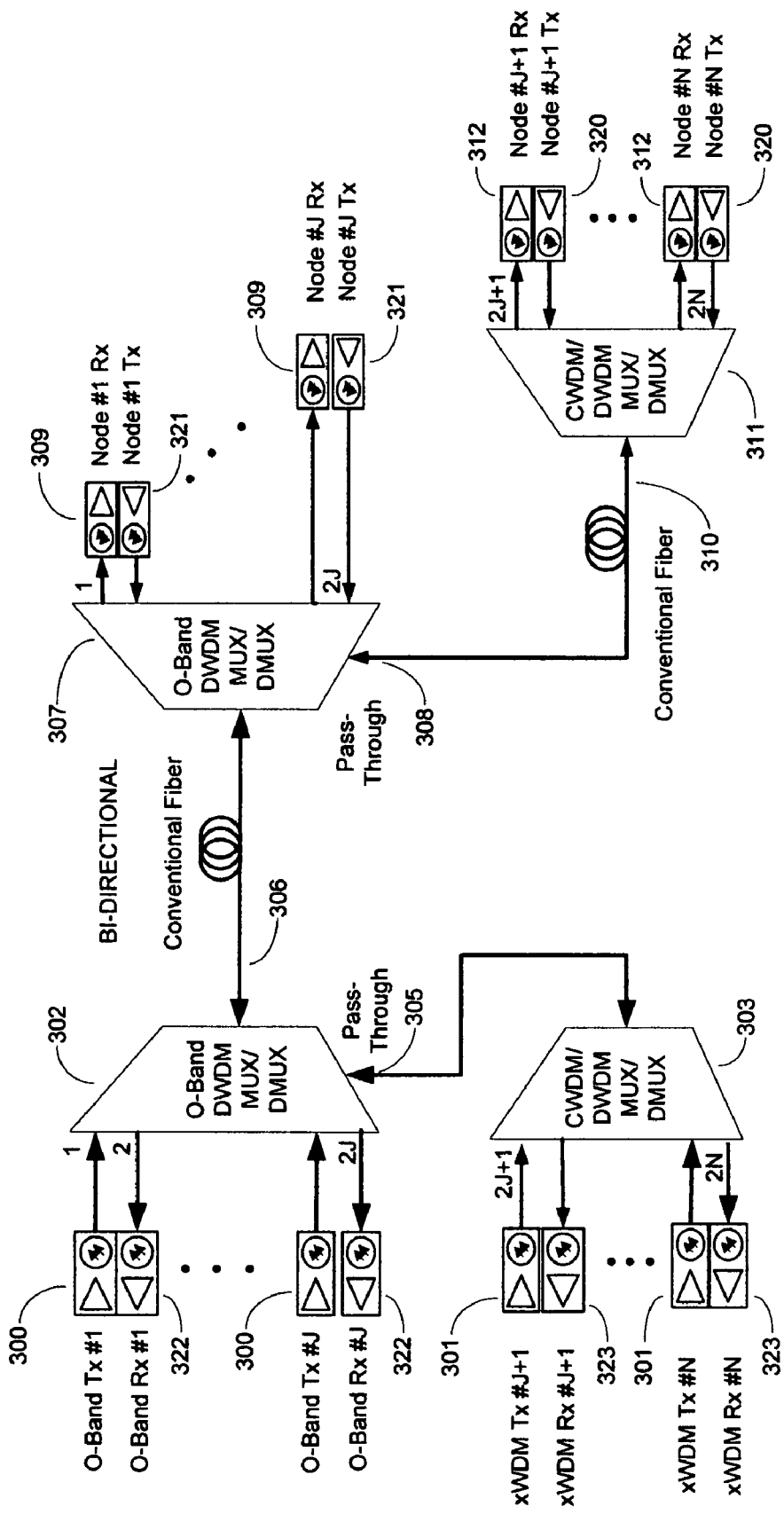
FIG. 7 is a block schematic view of a bi-directional O-Band DWDM network with legacy CWDM/DWDM, representing an embodiment of the invention.

O-Band LDWDM systems may be combined with appropriate sets of CWDM or C-Band DWDM optical channels in many possible embodiments. FIG. 7 presents a block diagram of a bidirectional "mixed" system of O-Band optical carriers and "legacy" CWDM or DWDM optical carriers. The outputs of N-J (where N-J≧1) CWDM/DWDM laser transmitters 301 are combined by a CWDM/DWDM bidirectional optical mux/demux 303, whose common port is connected to the pass-through port 305 of an appropriately designed bidirectional O-Band optical mux/demux 302.

The O-Band bidirectional mux/demux 302 then combines the N-J CDWM or DWDM transmitter outputs with the outputs of J (where J≧2) O-Band laser transmitters 300, each at a distinct wavelength or frequency selected from an O-Band optical channel plan, onto a common bidirectional transport fiber 306. Downstream O-Band carriers are separated into individual wavelengths by an appropriately designed O-Band bidirectional optical mux/demux 307 and directed by optical fiber to downstream receivers 309, which may be located in remote nodes or terminals.

The remaining group of downstream CWDM/DWDM optical carriers are directed through the pass-through port 308 of the bidirectional optical mux/demux 307 to a transport fiber 310 and into the common port of a CWDM/DWDM bidirectional optical mux/demux 311. The CWDM/DWDM bidirectional mux/demux 311 then separates the CWDM/DWDM optical carriers into individual wavelengths and directs them via optical fiber to downstream receivers 312, which may be located in remote nodes or terminals.

The outputs of N-J CWDM/DWDM return laser transmitters 320, which may be located in remote nodes or terminals, are combined by the CWDM/DWDM bidirectional optical mux/demux 311 onto a bidirectional transport fiber 310 and into the O-Band bidirectional mux/demux 307 via the pass-through port 308.

The O-Band bidirectional mux/demux 307 combines the CWDM/DWDM optical carriers with the outputs of J O-Band return transmitters 321, each at a distinct frequency selected from an O-Band optical channel plan, onto a common bidirectional transport fiber 306.

The O-Band bidirectional mux/demux 302 separates the J O-Band optical carriers into individual wavelengths and directs them to return receivers 322. The CWDM/DWDM optical carriers are directed through the pass through port 305 of the O-Band bidirectional mux/demux 320 to a bidirectional CWDM/DWDM mux/demux that separates the CWDM/DWDM upstream optical carriers into distinct wavelengths and directs them to return receivers 323.

The downstream laser transmitters 300, 301 and the bidirectional mux/demuxes 302, 303 may be located in a headend, hub, central office, or similar signal processing facility. The bidirectional mux/demuxes 307, 311 may be located in a hub or a remote facility such as a fiber splice enclosure, fiber management cabinet, or similar facility.

The preferred embodiment would use directly-modulated DFB O-Band laser transmitters 300, 321 because of their cost advantage; however, externally-modulated transmitters may also be used in either link. The O-Band transmitters 300,321 may transport a variety of signals, such as but not limited to RF SCM analog-modulated video, RF SCM M-QAM and N-VSB, and digital signals such as SONET, GbE, 10GbE, Fiber Channel, etc. The CWDM/DWDM transmitters 301, 320 may be restricted in their signal content as described previously. One of the legacy channels could also be a 1550 nm externally modulated laser transporting analog and QAM signals.

The optical channel center wavelengths, optical channel passbands and optical channel spacings of the bidirectional optical mux/demuxes 302, 307 are determined by the optical channel frequency plan and the need to accommodate CWDM/DWDM wavelengths. The wavelength separation between the legacy CWDM/DWDM channels and the O-Band channels has to be controlled to prevent SRS-induced crosstalk between the O-Band channels and the CWDM/DWDM channels. The optical channel separation or spacing of the O-Band optical frequency plan is non-uniform. A typical embodiment would have multiple O-Band wavelengths whose channel spacing ranges from 0.5 nm up to 20 nm, although other channel spacing ranges are possible. The O-Band bidirectional optical mux/demuxes 302, 307 may be implemented by a variety of technologies including, but not limited to, thin film interference filters, fiber Bragg gratings, bulk diffraction gratings, array waveguide gratings, and may be implemented in a consolidated or a distributed manner.

Figure 8:
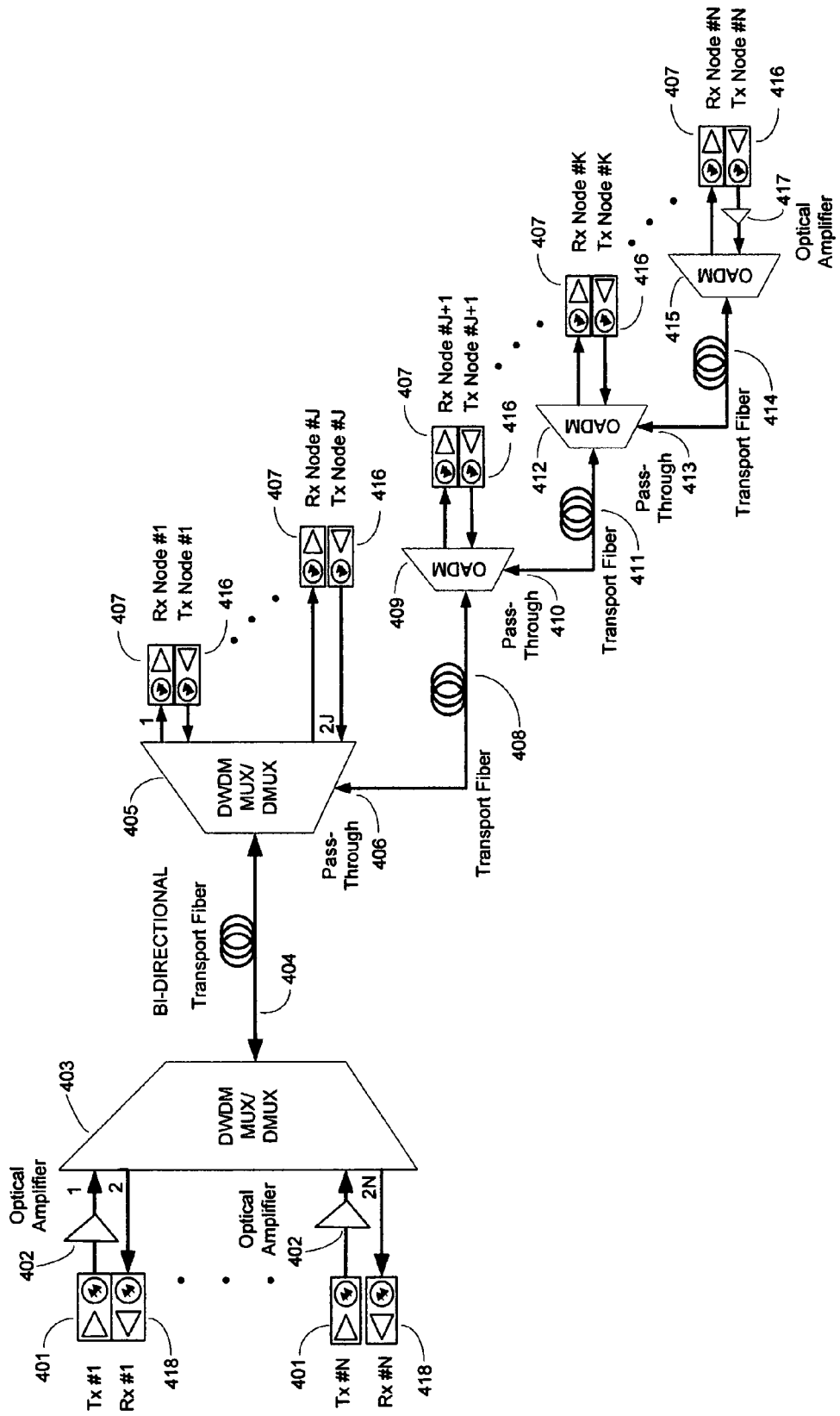
FIG. 8 is a block schematic view of a bi-directional LDWDM (low dispersion wavelength division multiplexing) network employing optical amplifiers, representing an embodiment of the invention.

Appropriate optical amplification technology may also be used with LDWDM systems, as shown by the embodiment presented in FIG. 8, and optically amplified bidirectional LDWDM system. The outputs of N downstream laser transmitters 401, each at a distinct wavelength or frequency selected from an optical frequency channel plan, are amplified by optical amplifiers 402 and combined onto a common bidirectional optical transport fiber 404 by a bidirectional optical multiplexer/demultiplexer (mux/demux) 403.

Of the N downstream optical carriers, J optical carriers are separated into individual wavelengths or frequencies by a bidirectional optical mux/demux 405. Each of the J downstream optical carriers separated at the bidirectional mux/demux is carried by optical fibers to corresponding downstream receivers 407, which may be located in remote nodes or terminals.

The remaining N-J optical carriers are directed to the pass-through port 406 of the bidirectional mux/demux 405 and carried by bidirectional transport fibers 408, 411, 414 through a cascade of bidirectional optical add/drop multiplexers 409, 412, 415, each of which selects a particular downstream wavelength to deliver to corresponding downstream receivers 407, which may be located in remote nodes or terminals.

The outputs of N-J return laser transmitters 416, each at a distinct wavelength or frequency selected from an optical channel plan, and which may be optically amplified by an optical amplifier 417, are then multiplexed by a cascade of bidirectional optical add/drop multiplexers 409, 412,415 onto bidirectional transport fibers 408, 411, 414 and into the pass-through port 406 of the bidirectional optical mux/demux 405.

The outputs of the J return laser transmitters 416, each at a distinct optical frequency or wavelength selected from an optical channel plan, are multiplexed with the outputs of the N-J return laser transmitters 416 by the bidirectional optical mux/demux 405 onto the bidirectional transport fiber 404. The bidirectional optical mux/demux 403 separates the N return optical carriers by individual wavelengths and delivers them to corresponding return receivers 418.

The downstream laser transmitters 401, the bidirectional mux/demux 403, and the return receivers 418 may typically be located in a headend, hub, central office, or similar signal processing facility. The downstream receivers 407 and the return transmitters 416 may typically be located in optical nodes or remote terminals.

The preferred embodiment would use directly-modulated DFB laser transmitters because of their cost advantage; however, externally-modulated transmitters may also be used in any link. The transmitters 401 and 416 may transport a variety of signals, such as but not limited to RF SCM analog-modulated video, RF SCM M-QAM and N-VSB, and digital signals such as SONET, GbE, 10GbE, Fiber Channel, etc.

The individual wavelengths at which each downstream laser transmitter 401 and each return laser transmitter 416 operates is selected from a set of optical channel wavelengths that are in close proximity to the zero dispersion wavelength of the transport fibers 404, 408, 411, 414. In an embodiment in which the transport fibers 404, 408, 411, 414 are SMF-28 or an equivalent fiber, the wavelengths of transmitters 401, 416 would lie in the O-Band. Optical amplifiers 402, 417 would use O-Band optical amplification technology such as, but not limited to, praseodymium doped fiber amplifiers (PDFAs), semiconductor optical amplifiers, Raman amplifiers or other O-Band amplification technology. In an embodiment in which transport fibers 404, 408, 411, 414 are dispersion shifted fibers with zero-dispersion wavelength in the C-Band, the wavelengths of transmitters 401, 416 would lie in the C-Band, and optical amplifiers 402, 417 would use optical amplification technology such as, but not limited to, erbium doped fiber amplifiers (EDFAs).

The optical channel center wavelengths, optical channel passbands and optical channel spacings of the bidirectional optical mux/demuxes 403, 405 and the optical add/drop multiplexers 409, 412, 415 are determined by the optical channel frequency plan. The optical channel separation or spacing of the optical frequency plan is non-uniform. A typical embodiment would have multiple wavelengths whose channel spacing ranges from 0.5 nm up to 20 nm, although other channel spacing ranges are possible. The bidirectional optical mux/demuxes 403, 405 and the optical add/drop multiplexers 409, 412, 415 may be implemented by a variety of technologies including, but not limited to, thin film interference filters, fiber Bragg gratings, bulk diffraction gratings, array waveguide gratings, and may be implemented in a consolidated or a distributed manner.

The embodiments described above are provided by way of example. Other embodiments are possible, and are not limited to those specifically described here.

Optical channel plans for low-dispersion-regime DWDM systems (LDWDM) must be optimized against several competing constraints. While operation close to the zero-dispersion wavelength using narrow channel spacing alleviates the problems of SRS-induced crosstalk and dispersion/chirp-induced CSO, other types of crosstalk caused by fiber nonlinearities such as XPM and 4WM become dominant for small channel spacing in this spectral region of the optical fiber.

XPM arises when the power in one modulated wavelength channel induces a small change in the refractive index of the fiber (through the nonlinear refractive index), which in turn induces a phase modulation (PM) on the other wavelengths. Chromatic dispersion in the fiber then converts this phase modulation to intensity modulation (IM). The PM to IM conversion causes some amount of the modulated signal on one optical carrier to appear on other optical carriers, i.e. crosstalk. Since chromatic dispersion is necessary for XPM crosstalk, XPM crosstalk near the zero-dispersion wavelength is negligible.

In the general case of four-wave mixing (4WM), lightwaves at two or more distinct frequencies propagating in the optical fiber can interact through the third-order nonlinear optical susceptibility to create lightwaves at other frequencies. This mixing process can produce lightwaves at all possible sum and difference frequency combinations, although light at many of the possible frequency mixing terms will not be produced in any significant quantity because the phase-matching requirements of this traveling-wave process will not be satisfied in the fiber. The frequency mixing terms of concern are those that lie in proximity to the zero-dispersion wavelength of the fiber and are phase-matched for the mixing interaction—these frequency mixing products are all of the form $f_i+f_j-f_k$, where k is distinct from i or j. This situation is directly analogous to the composite triple-beat (CTB) problem of the RF carrier spectrum of analog video transport, where intermodulation products are generated within the carrier spectrum. As mentioned previously, HFC access networks have historically used SMF-28 or equivalent fibers. In these fibers, the zero-dispersion wavelength is located at approximately 1311 nm in O-Band but the invention applies to any DWDM system with directly modulated DFB transmitters with wavelengths located in proximity to the zero-dispersion wavelength of the fiber used.

As described above, the frequencies of the in-band (optical) four-wave mixing products are given by:

$$f_{ijk}=f_i+f_j-f_k,\ i,j\neq k \quad (1)$$

where $f_{ijk}$ are the optical frequencies of the four-wave mixing products and $f_i$ are the optical frequencies of the original DWDM channels.

Thus, in a DWDM system with N wavelengths present, the total number of four-wave mixing products, M, is given by:

$$M = N\binom{N}{2} = \left(\frac{N^2}{2}\right)(N-1) \quad (2)$$

For example, there are nine mixing products for N=3, 24 mixing products for N=4 and 450 mixing products for N=10.

If one of the mixing products occurs at the same optical frequency as an existing DWDM channel the result is 4WM crosstalk. Since M increases as $N^3$, it becomes extremely difficult to avoid 4WM crosstalk as N increases above 10.

In a DWDM system with three equally-spaced signals at optical frequencies $f_1$, $f_2$, and $f_3$ there are nine mixing products: $f_{113}$, $f_{112}$, $f_{123}$, $f_{223}$, $f_{132}$, $f_{221}$, $f_{332}$, $f_{231}$, and $f_{331}$. However, because of their equal spacing, note that $f_{223}=f_2+(f_2-f_3)=f_1$, and similarly $f_{132}=f_2$, $f_{312}=f_2$ and $f_{221}=f_3$. That is, 4WM crosstalk is inevitable if there are three or more equally spaced channels in the DWDM system.

Equally spaced channels would therefore be employed only with large channel spacings and/or at wavelengths far from the zero-dispersion wavelength so that four-wave mixing products are sufficiently weak due to lack of phase-matching. It may also be possible to use equally spaced channels by restricting analog video to be the sane for all wavelengths (for broadcast applications) and allow only the narrowcast QAM channels, which are more robust to crosstalk, to differ.

Efficient generation of four-wave mixing products require the signals to stay in phase (phase-matching) with each other over as long an interaction length as possible. Fiber dispersion results in temporal walk-off due to group-velocity mismatch and a corresponding decrease in the effective interaction length. Consequently, mixing efficiency—the ratio of power in the mixing products to the input channel power—decreases rapidly for wavelengths that differ from the zero-dispersion wavelength by even a few nm.

In the presence of dispersion, mixing efficiency can also be reduced by increasing DWDM channel spacing. Mixing efficiency is also very sensitive to optical power levels, having a 20 log(P) dependence on DWDM channel power. In long-haul networks, 4WM is minimized by dispersion management whereby fiber spools with positive and negative dispersion are alternated to achieve a net dispersion of zero while maintaining a non-zero dispersion at all points of the fiber link. This technology, however, cannot be used in short optical access links with sub-carrier-multiplexed (SCM) analog video and QAM-modulated RF signals transporting video, voice, and data due to limited loss budget over which these links operate and lack of cost-effective optical amplification technology for this application.

Analog video transmission can tolerate only extremely low levels of crosstalk. Reduction of crosstalk to acceptably low levels can be achieved by the following 4WM crosstalk suppression techniques: operation at wavelengths slightly offset from the fiber zero-dispersion wavelength and the use of unequal optical channel spacings. Although this is bandwidth inefficient, most WDM systems use channel spacing much larger than the bandwidth of the signals. Unequal channel spacing uses some of this "wasted bandwidth" to place 4WM products away from the channels. Note that it is not sufficient for the mixing products to be offset from the WDM channels; the offset of the mixing products from the WDM channels must be larger than the passband of the WDM filters used for multiplexing and demultiplexing. Mixing products can be guaranteed not to fall on WDM channels by requiring the difference between any two channel frequencies to be unique.

Note that this requirement makes LDWDM systems distinctly different in optical carrier frequency assignment than CWDM per ITU G.694.2 and DWDM systems with wavelengths located at larger separations from the zero-dispersion frequency of the fiber (for example, L- and C-Band DWDM systems per ITU G.6941 deployed on SMF-28 or equivalent fibers).

Prior to this invention, the challenge presented by distortion and crosstalk due to linear and nonlinear optical fiber effects on RF SCM analog video and RF QAM carriers has prevented the development and deployment of a multi-wavelength system operating in proximity to the zero-dispersion wavelength of single mode optical fiber with full RF channel load from the lowest to the highest forward frequency of SCM systems (typically used in, but not limited to, cable TV applications with frequency range from 50 to 1002 MHz in North America, 65 to 1002 MHz in Japan and from 85 to 1002 MHz in Europe). The main characteristic of the fully loaded signal spectrum with SCM analog and QAM channels is that the RF load occupies several octaves of the RF spectrum. Specifically, for SMF-28 or equivalent type optical fiber (which historically has been the predominantly deployed fiber in HFC access plant), there has been no development and deployment of a multi-wavelength system operating in O-Band in the proximity to the zero-dispersion wavelength of this fiber at 1311 nm wavelength.

Many particular embodiments of optical frequency channel plans for low-dispersion dense wavelength division multiplex systems (LDWDM) are possible, depending upon how competing constraints are balanced. However, optical frequency channel plans can be described generally by characteristic features and constraints. First, it should be noted that any set of segments of a given fiber type, such as SMF-28 or an equivalent, will exhibit a range of zero-dispersion frequencies from $f_{0,min}$ to $f_{0,max}$ about a central or average value of zero-dispersion frequency $f_0$; this range may be defined by the absolute limits of the manufacturers' specifications or statistically by a characteristic width of a distribution function describing the set of zero-dispersion frequency values in a given set of fiber lengths. Typically deployed fiber links are composed of many fiber segments that are spliced together.

The basic characteristic of an LDWDM optical frequency channel plan is the use of multiple optical carriers whose frequencies lie as close as possible to the average value of the zero-dispersion frequency (or wavelength) of a fiber link, or near either the low frequency or high frequency edge of the range of zero-dispersion frequencies as described above, subject to the constraints necessary to reduce crosstalk effects. The use of optical transmission carrier frequencies near the zero-dispersion frequency, or range of zero-dispersion frequencies, of a given fiber type, such as O-Band wavelengths for SMF-28 or equivalent fiber, greatly reduces dispersion-induced distortions. This in turn allows the use of directly modulated DFB lasers, without severe restrictions on the value of the chirp parameter of such lasers, to transport multi-octave RF SCM analog video and quasi-analog QAM video, voice, and data signals. Using optical channel frequencies near the average zero-dispersion frequency of a transport fiber also reduces the crosstalk due to XPM, as discussed above.

Although not strictly necessary, a minimum frequency (or wavelength) separation may be chosen for convenience to define a frequency grid—typically, but not limited to, 10 GHz, 50 GHz, 100 GHz, or 200 GHz. The choice of a particular minimum frequency separation may be determined in part by the specifications of the optical multiplexers, optical demultiplexers and optical add/drop multiplexers. Specific optical transmission frequencies can be selected on such a grid to meet the constraints that minimize crosstalk and distortion.

The primary constraint on the selection of optical channel frequencies is that the frequency difference between any two optical carriers be unique. This produces a non-uniformly spaced set of optical channels whose four-wave mixing products do not fall on the selected channel frequencies.

Four wave mixing effects may be further reduced by choosing all optical channel transmission frequencies to be greater than the maximum zero dispersion frequency or less than the minimum zero dispersion frequency of the set of all fiber segments comprising an optical fiber link. This condition disrupts phase-matching of the four wave mixing process by allowing the optical carriers to experience small amounts of dispersion. In some embodiments, adequate reduction of four wave mixing effects may be obtained by requiring that all optical carrier frequencies be greater than the maximum zero dispersion frequency or less than the minimum zero dispersion frequency of the fiber segment or segments comprising the first 2.5 km or first 5 km of the fiber link. Such conditions reduce phase-matching of the four wave mixing process in the section of the optical fiber link where the optical power levels that drive the four wave mixing process are greatest.

Additional reductions in four wave mixing effects may be obtained by maximizing the frequency difference between the two optical carriers that are closest to the average zero-dispersion frequency of the transport fiber, again by disruption of phase-matching.

The optical frequency difference between any two optical carriers should be as great as possible to minimize XPM-driven crosstalk.

For a given number of optical carriers, the frequency difference between the highest and lowest frequencies of the optical carriers should be minimized to reduce SRS-induced crosstalk.

Figure 9:
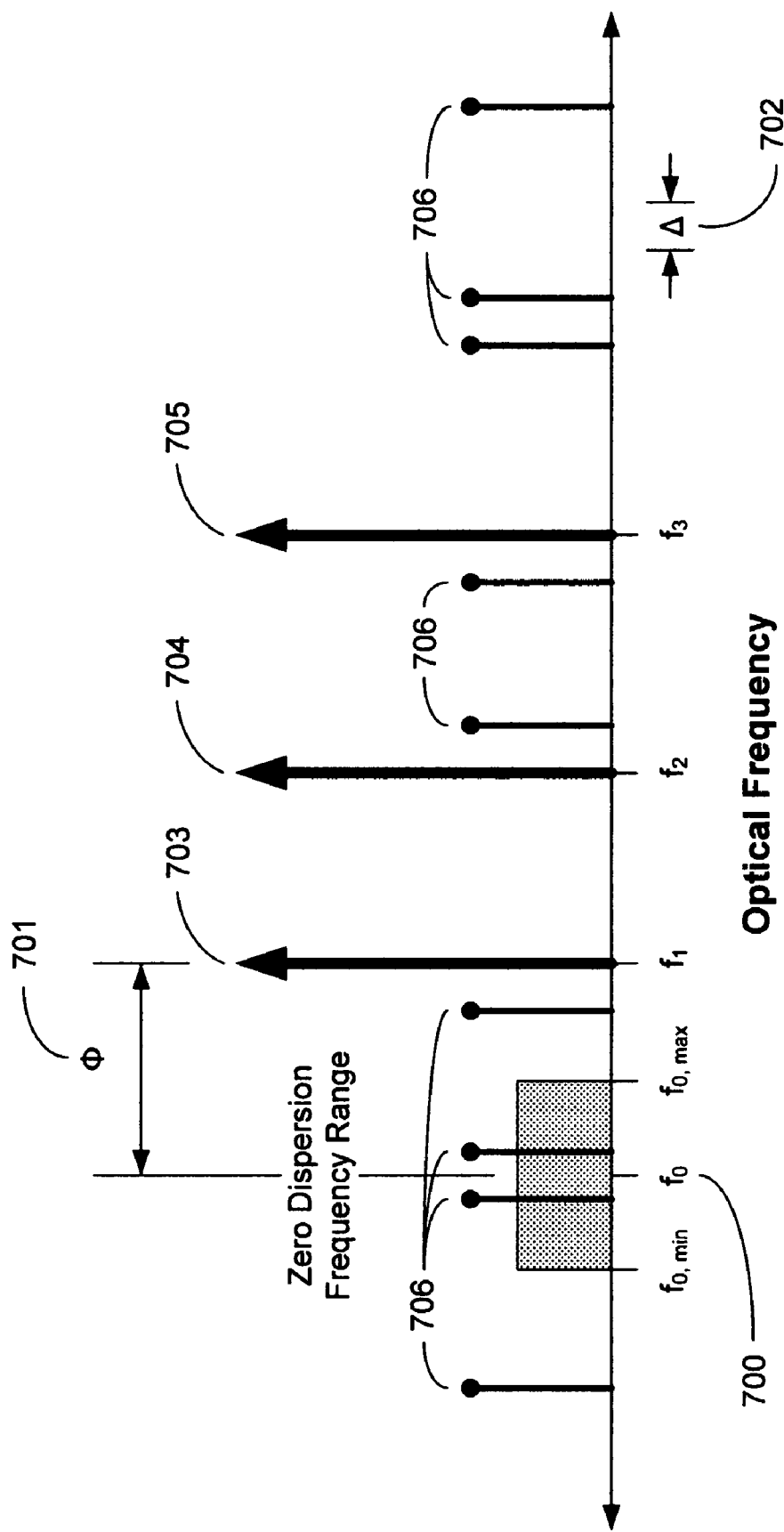
FIG. 9 is a block schematic view of a three channel LDWDM (low dispersion wavelength division multiplexing) optical frequency plan, representing an embodiment of the invention.

By way of example, a particular embodiment of an LDWDM optical frequency plan with three optical carriers is presented schematically in FIG. 9. On a horizontal axis that represents a range of optical frequencies, the average zero dispersion frequency $f_0$ 700 is shown, along with a range of zero dispersion frequencies $f_{0,min}$ to $f_{0,max}$. A first optical carrier 703 is established at frequency $f_1$ with a frequency separation of $\Phi$ 701 from the average zero dispersion frequency $f_0$ 700. With a minimum frequency separation of $\Delta$ 702, a second optical carrier 704 is established at $f_2$, where $f_2=f_1+4\Delta$. A third optical carrier 705 is established at $f_3$, where $f_3=f_1+9\Delta$. These three optical carriers produce 9 four-wave mixing products 706 at frequencies $f_1-9\Delta$, $f_1-5\Delta$, $f_1-4\Delta$, $f_1-\Delta$, $f_1+5\Delta$, $f_1+8\Delta$, $f_1+13\Delta$, $f_1+14\Delta$, and $f_1+18\Delta$. Pass-band widths of optical multiplexers, optical demultiplexers, optical add/drop multiplexers, and optical filters would be chosen to reject the four-wave mixing products 706 during multiplexing or demultiplexing. Note that no vertical scale is implied in FIG. 9.

Many other embodiments of optical frequency channel plans are possible. Different multiples of different minimum frequency separations can be used to establish different optical carrier frequencies. Optical carrier frequency plans may be translated with respect to the average zero dispersion frequency of the transport fiber, optical carrier frequency plans may be "inverted" or "mirrored" about any specific frequency, and optical carrier frequency plans may be produced by the combination of frequency translation and inversion.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. Homologous replacements may be substituted for the substances described herein. Agents which are both chemically and physiologically related may be substituted for the agents described herein where the same or similar results would be achieved.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising transporting a plurality of optical carriers of different wavelengths transporting at least one signal selected from the group consisting of radio frequency sub carrier modulated analog and radio frequency sub carrier modulated quasi-analog over a transport fiber using low dispersion wavelength division multiplexing,
    wherein a plurality of optical channel center wavelengths defined by the plurality of optical carriers are clustered proximate a zero dispersion wavelength of the transport fiber and
    wherein a plurality of optical channel center frequencies defined by the plurality of optical channel center wavelengths are non-uniformly spaced apart,
    wherein all of a plurality of optical channel center frequencies are a) greater than a maximum zero dispersion frequency or b) less than a minimum zero dispersion frequency of all the optical segments to disrupt phase-matching with regard to four wave mixing by allowing all the plurality of optical carriers to experience small amounts of dispersion.

2. The method of claim 1, wherein all differences between all of the plurality of optical channel center frequencies are unique to produce a non-uniformly spaced set of optical channel center frequencies whose four-wave mixing products are not equal to one or more of the plurality of the optical channel center frequencies.

3. The method of claim 1, wherein optical channel frequencies of the optical carriers are multiples of a minimal frequency separation.

4. The method of claim 1, wherein all of the plurality of optical channel center wavelengths are clustered within 50 nm of the zero-dispersion wavelength of the transport fiber.

5. The method of claim 1, wherein spacings between the plurality of optical channel center wavelengths are from approximately 0.5 nm to approximately 20 nm.

6. An apparatus, comprising a low dispersion wavelength division multiplexing network transporting a plurality of optical carriers of different wavelengths transporting at least one signal selected from the group consisting of radio frequency sub carrier modulated analog and radio frequency sub carrier modulated quasi-analog using low dispersion wavelength division multiplexing, the low dispersion wavelength division multiplexing network including:
    an optical multiplexer;
    a transport fiber coupled to the multiplexer; and
    an optical demultiplexer coupled to the transport fiber,
    wherein a plurality of optical channel center wavelengths defined by the plurality of optical carriers are clustered proximate a zero dispersion wavelength of the transport fiber and
    wherein a plurality of optical channel center frequencies defined by the plurality of optical channel center wavelengths are non-uniformly spaced apart,
    wherein all of a plurality of optical channel center frequencies are a) greater than a maximum zero dispersion frequency or b) less than a minimum zero dispersion frequency of all the optical segments to disrupt phase-matching with regard to four wave mixing by allowing all the plurality of optical carriers to experience small amounts of dispersion.

7. The apparatus of claim 6, wherein a pass-band width of at least one member selected from the group consisting of the optical multiplexer, the optical demultiplexer, an optical add/drop multiplexer, and an optical filter rejects four-wave mixing products during multiplexing or demultiplexing.

8. The apparatus of claim 6, wherein an offset of the mixing products from the wavelength division multiplexing channels are all larger than a passband of wavelength division multiplexing filters used for multiplexing and demultiplexing.

9. An apparatus, comprising a low dispersion wavelength division multiplexing network transporting a plurality of optical carriers of different wavelengths transporting at least one signal selected from the group consisting of radio frequency sub carrier modulated analog and radio frequency sub carrier modulated quasi-analog using low dispersion wavelength division multiplexing, the low dispersion wavelength division multiplexing network including:
    an optical multiplexer;
    an optical link coupled to the multiplexer, the optical link including a plurality of optical segments; and
    an optical demultiplexer coupled to the optical link,
    wherein a plurality of optical channel center wavelengths defined by the plurality of optical carriers are clustered proximate zero-dispersion wavelength of the optical link,
    wherein a plurality of optical channel center frequencies defined by the plurality of optical channel center wavelengths are non-uniformly spaced apart, and
    wherein all of a plurality of optical channel center frequencies are a) greater than a maximum zero dispersion frequency or b) less than a minimum zero dispersion frequency of all the optical segments to disrupt phase-matching with regard to four wave mixing by allowing all the plurality of optical carriers to experience small amounts of dispersion.

10. The apparatus of claim 9, wherein a pass-band width of at least one member selected from the group consisting of the optical multiplexer, the optical demultiplexer, an optical add/drop multiplexer, and an optical filter rejects four-wave mixing products during multiplexing or demultiplexing.

11. The apparatus of claim 9, wherein an offset of the mixing products from the wavelength division multiplexing channels are all larger than a passband of wavelength division multiplexing filters used for multiplexing and demultiplexing.

12. A system comprising a plurality of optical carriers generated by optical laser transmitters at a plurality of different optical frequencies transporting at least one signal selected from the group consisting of radio frequency sub carrier modulated analog and radio frequency sub carrier modulated quasi-analog are multiplexed onto a single transport fiber using low dispersion wavelength division multiplexing,
    wherein each of the plurality of different optical frequencies transport at least one radio frequency sub carrier modulated signal occupying several octaves, wherein these optical frequencies all lie within a narrow range of within ±approximately 50 nm of the zero-dispersion wavelength of the single transport fiber, and wherein all of a plurality of optical channel center frequencies are a) greater than a maximum zero dispersion frequency or b) less than a minimum zero dispersion frequency of all the optical segments to disrupt phase-matching with regard to four wave mixing by allowing all the plurality of optical carriers to experience small amounts of dispersion.

* * * * *

UNITED STATES PATENT AND TRADEMARK OFFICE
CERTIFICATE OF CORRECTION

| | | |
|---|---|---|
| PATENT NO. | : 8,213,797 B2 | Page 1 of 1 |
| APPLICATION NO. | : 11/810392 | |
| DATED | : July 3, 2012 | |
| INVENTOR(S) | : Willem A Mostert et al. | |

It is certified that error appears in the above-identified patent and that said Letters Patent is hereby corrected as shown below:

At column 20, line 34, insert the term --a-- before the phrase "zero-dispersion".

Signed and Sealed this
Twenty-eighth Day of August, 2012

David J. Kappos
*Director of the United States Patent and Trademark Office*